United States Patent
Ramsey et al.

[11] Patent Number: 6,133,556
[45] Date of Patent: Oct. 17, 2000

[54] HEATED DEFORMABLE SUPPORT

[76] Inventors: Douglas P. Ramsey, 20 Ellington Cir., Rochester, N.Y. 14612; Russell J. Sinacori, 10 Jamee La., Rochester, N.Y. 14606

[21] Appl. No.: 09/294,225

[22] Filed: Apr. 19, 1999

[51] Int. Cl.[7] .................................................. H05B 3/06
[52] U.S. Cl. ........................................................ 219/521
[58] Field of Search ................................... 219/521, 530; 392/339, 348; 126/400, 263.07; 607/108–114, 96; 400/715; 248/118, 118.1

[56] References Cited

U.S. PATENT DOCUMENTS

| | | | |
|---|---|---|---|
| 1,439,094 | 12/1922 | Gingras | 219/529 |
| 4,777,346 | 10/1988 | Swanton, Jr. | 607/98 |
| 5,163,646 | 11/1992 | Engelhardt | 248/118 |
| 5,386,956 | 2/1995 | Hatcher | 248/118 |
| 5,407,156 | 4/1995 | Rossman et al. | 248/118.1 |
| 5,562,270 | 10/1996 | Montague | 248/118.1 |
| 5,566,913 | 10/1996 | Prokop | 248/118 |
| 5,674,423 | 10/1997 | Wright, Sr. | 219/549 |
| 5,686,005 | 11/1997 | Wright, Sr. | 219/549 |
| 5,713,544 | 2/1998 | Wolf et al. | 248/118 |
| 5,730,711 | 3/1998 | Kendall et al. | 602/64 |
| 5,826,841 | 10/1998 | Lavore | 248/118 |
| 5,828,034 | 10/1998 | Chang | 219/209 |
| 5,835,983 | 11/1998 | McMahen et al. | 219/527 |
| 5,954,303 | 9/1999 | Wolf et al. | 248/118.3 |
| 5,980,143 | 11/1999 | Bayer et al. | 400/715 |

Primary Examiner—Teresa Walberg
Assistant Examiner—Vinod D Patel
Attorney, Agent, or Firm—Harter, Secrest & Emery LLP; Brian B. Shaw, Esq.; Stephen B. Salai, Esq.

[57] ABSTRACT

A heated, deformable support may be placed adjacent to a computer keyboard or mouse to support the operator's wrist or hand. Heat from the support is transferred to the operator's wrist or hand, and the support deforms to conform to the wrist or hand, to provide comfort and relieve stress during operation or the keyboard or mouse.

23 Claims, 4 Drawing Sheets

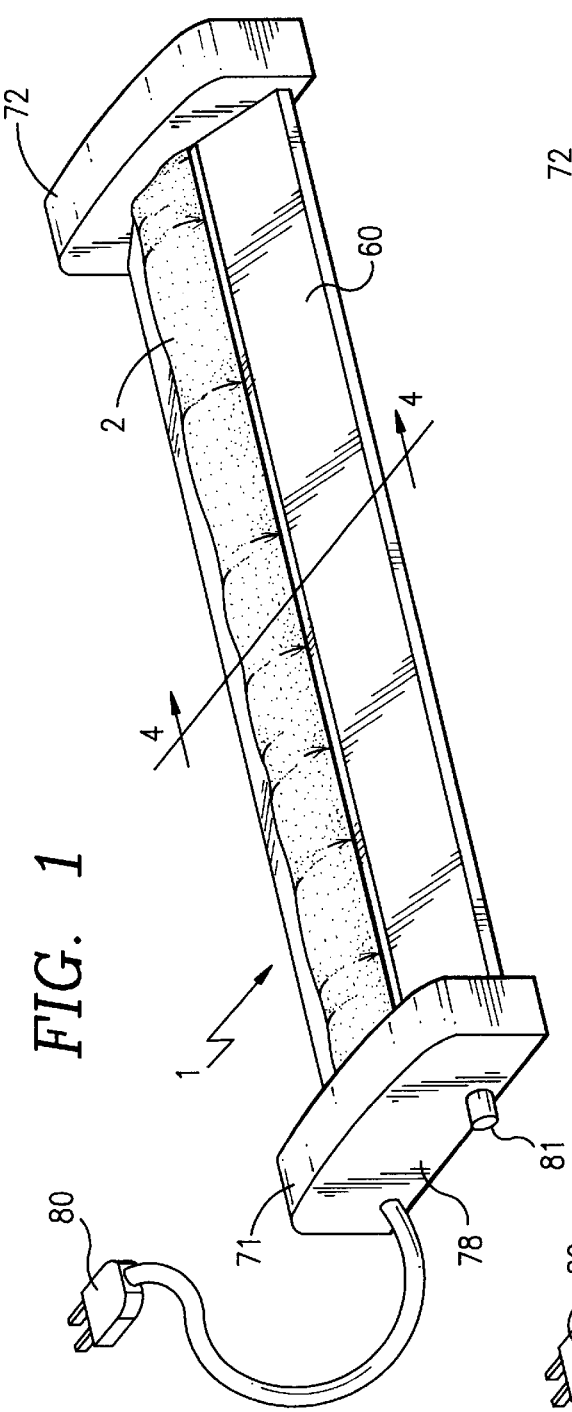
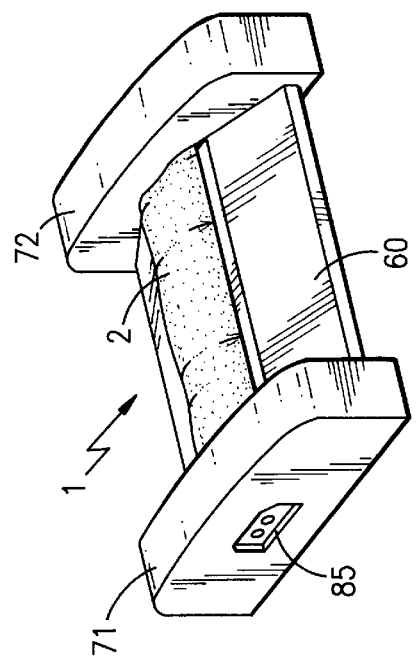
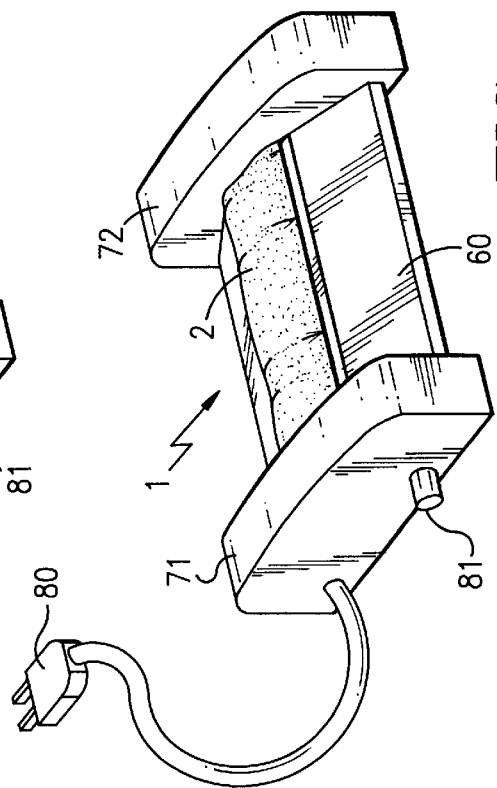

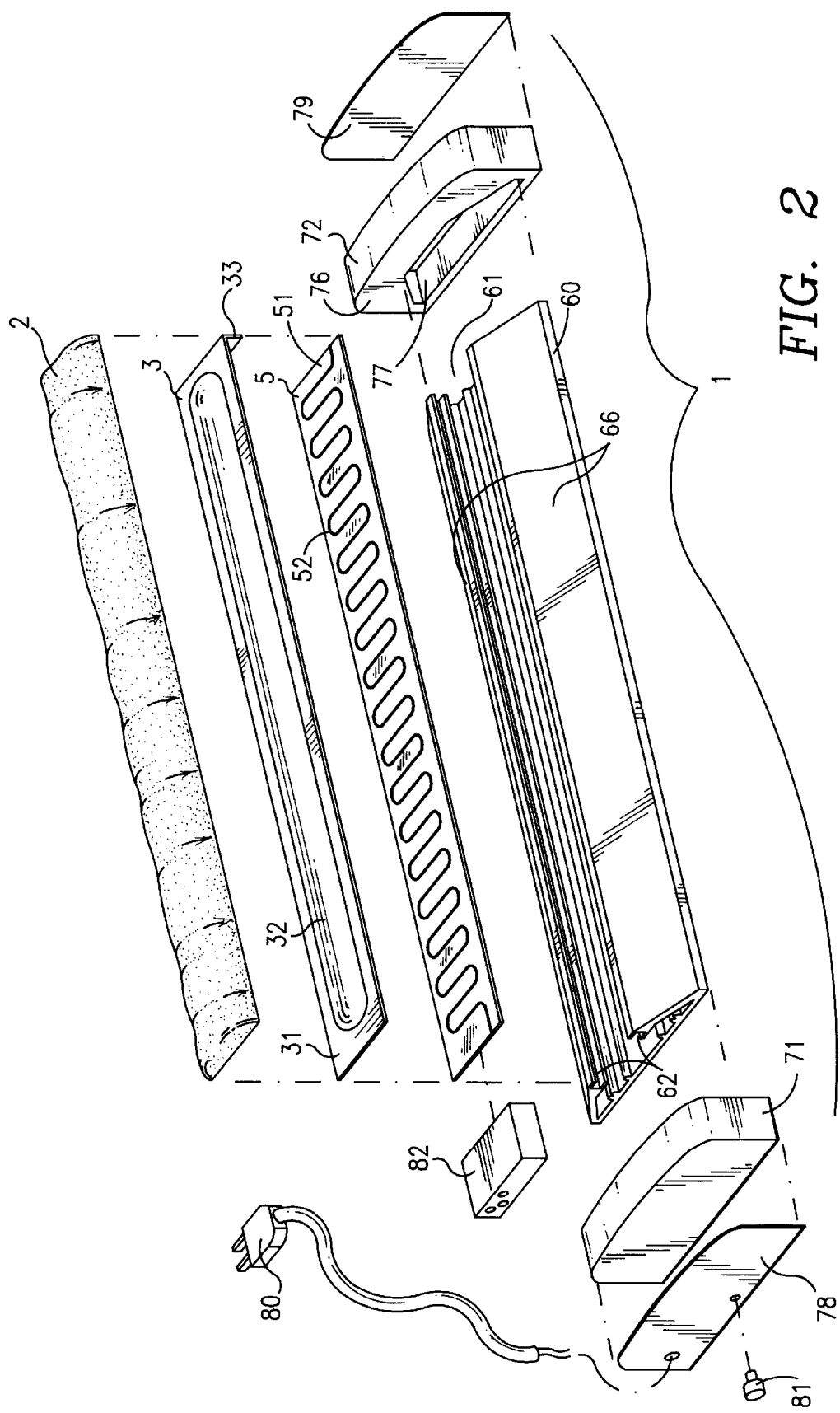

HEATED DEFORMABLE SUPPORT

FIELD OF THE INVENTION

This invention relates to a heated, deformable support for a person's wrist or hand. The support may be used in conjunction with operation of a computer keyboard or mouse to increase comfort or relieve stress on the wrist or hand during operation.

BACKGROUND OF THE INVENTION

Continuous operation of a device such as a computer keyboard or mouse may lead to fatigue or discomfort in the region of the operator's hand or wrist. Additionally, continuous operation over a substantial period of time may lead to repetitive motion stress injury such as carpal tunnel syndrome.

To relieve fatigue and inhibit the onset of repetitive motion stress injury, various supports for the operator's hand or wrist have been proposed. For example, some supports aim to maintain the operator's hand or wrist in a predetermined, ergonomically desirable orientation during operation of a keyboard or mouse. In such supports, the operator's hand or wrist is supported on a rigid surface.

U.S. Pat. Nos. 5,674,423 and 5,686,005 disclose a heated pad especially adapted for use in conjunction with a computer keyboard or mouse. The top surface of the pad includes a support surface for a user's wrist, this surface being planar or having a curved depression. An electrical heating unit is embedded in a layer beneath the support surface, such that heat is delivered to the operator's hand and wrist during operation of the keyboard or mouse, and thereby treats stress to the hand and wrist while operating the keyboard or mouse. The support described in these patents supplies heat to the operator's wrist or hand, but the support is rigid. Additionally, assembly or manufacture of such a device is relatively complicated.

SUMMARY OF THE INVENTION

This invention provides an improved device for supporting at least a portion of the wrist or hand during operation of a computer keyboard, mouse or similar finger-operated device. The device provides heat to a wrist or hand supported thereon so as to relieve fatigue and/or reduce stress induced by repetitive motion. The support portion of the device is formed of a flexible, deformable body that at least partially conforms to the operator's wrist or hand when supported thereon, providing comfort to the operator. The support device is relatively easy and inexpensive to manufacture and assemble.

According to embodiments of this invention, the device comprises the support member including the flexible, deformable body; and a heat source in thermal connection with the support, whereby heat from the heat source is transferred to a wrist or hand supported on the support member body. The device may further comprise a heat distributor plate intermediate the support member and the heat source, the heat distributor plate being in thermal contact with the heat source and the support member being received on a top surface of the plate. The heat distributor plate may be supported on a base of the device.

According to other embodiments, two devices are provided, each of the devices comprising a flexible, deformable, heat conductive body member, wherein the body member of the first device has a length sufficient to accommodate placement of two wrists of a person on the upper surface thereof, and the body member of the second device has a length sufficient to accommodate placement of only one wrist of a person on the upper surface thereof. Preferably, the first device is adapted for placement adjacent a computer keyboard, and the second device is adapted for placement adjacent a computer mouse. The heat source of the first device is in electrical connection with a power source, and the heat source of the second device may be connected in series to the power source through the first device.

The invention also relates to a method for inputting data to a computer which simultaneously treats repetitive motion stress to at least a portion of a computer user's hand. The method comprises manually operating a computer input device that is operated by a repetitive motion by a user, and heating at least a portion of a user's hand or wrist during operating of the input device while the user's hand or wrist is supported on a heated, flexible, deformable body that has at least partially conformed to the user's hand or wrist supported thereon.

BRIEF DESCRIPTION OF THE DRAWINGS

FIG. 1 is a perspective view of a first embodiment of a wrist support.

FIG. 2 is an exploded view of various component parts of the embodiment shown in FIG. 1.

FIG. 3 is a perspective view of a second embodiment of a wrist support.

FIG. 6 is a perspective view of another embodiment of a wrist support.

DETAILED DESCRIPTION OF THE PREFERRED EMBODIMENT

FIGS. 1 and 2 illustrate a first embodiment of a device of this invention. Support device 1 is especially adapted for placement on a work surface adjacent a computer keyboard, so that when an operator is using the keyboard, at least a portion of the operator's hand or wrist is supported on the support device. Generally, the illustrated embodiment will be placed directly against the bottom edge of the keyboard, although an individual operator may desire to place the support device a slight distance from this keyboard bottom edge. The device may be referred to herein as a wrist support, but it is understood that, depending on how close the operator chooses to place the device with respect to a keyboard, or how far the operator's hand extends over the keyboard, the device may support a portion of the wrist and/or the hand, or even part of the arm above the wrist area.

Support device 1 includes a flexible, deformable support member 2 on which the operator's wrists or hands are placed during use. By flexible, it is meant that support member 2 is non-rigid and pliable. By deformable, it is meant that support member 2 deforms under the weight of an operator's wrists placed thereon. In addition, it is important that support member 2 is relatively heat conductive since, as explained in more detail below, heat is transferred through the support member to the operator's wrist placed thereon.

Figure 4:
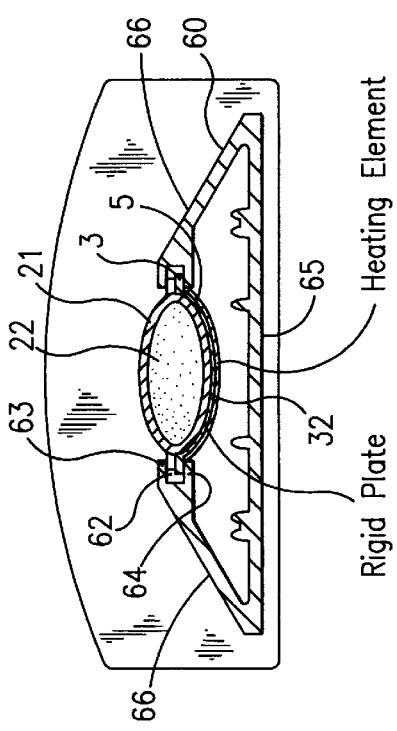
FIG. 4 is a cross-sectional view along line 4—4 of FIG. 1.

In the illustrated embodiment, and as also shown schematically in the cross-sectional view of FIG. 4, support member 2 has the form of an elongate, sealed, flexible casing or bladder 21 at least partially filled with a liquid-containing medium 22. The casing may be substantially filled with the liquid medium, that is, filled in a manner that substantially no air or other gases, other than minor amounts of gas dissolved in the liquid medium, are present in the casing interior.

Support member 2 deforms when an operator's wrist is rested thereon, i.e., for the described embodiment, a portion of the fluid in the region contacted by the operator's wrist will be displaced to another region of the casing. However, it is preferred that not all fluid in this contacted region is displaced, so that the fluid in the support member provides a conforming, cushioned surface for a wrist placed thereon. For the described embodiment, the deformability of support member 2 will depend on the flexibility of casing 21, the pressure at which casing 21 is filled with liquid 22, and the viscosity of liquid 22. Casing 21 may be formed of any relatively pliable plastic, such as a pliable polyurethane elastomer. Liquid 22 preferably has a viscosity higher than water, more preferably a viscosity higher than 1 poise at 20° C., or at least 15 poise at 20° C., but the viscosity should not be so high to unduly inhibit deformability of the support member. For example, liquid-based gels having some flowability at room temperature are representative of liquid-containing media approaching the desired upper range of viscosity. One particular embodiment of a liquid-containing medium is a composition comprising thickened corn syrup and water. The pressure at which the casing is filled may be selected according to the specific liquid composition and casing flexibility.

Support member 2 is supported on plate 3. Plate 3 is preferably constructed of a relatively rigid material, so that the weight of a wrist placed on the device will not bend the plate, and a heat conductive material, so that heat is transferred from a heating element to support member 2. In the illustrated embodiment, plate 3 has the form of a metal plate including planar surface 31 surrounding concave recess 32, the concave recess 32 facilitating retention of support member 2 in position on the plate. Plate 3 also serves to distribute heat relatively evenly to support member 2. Support member 2 is preferably removable from plate 3, for example, it is preferred that support member is not adhered to plate 3. Accordingly, for the described embodiment, support member 2, once heated, may be removed from plate 3 by an operator and placed on a part of the body to obtain heat therapy.

A heating element 5 is located beneath and in thermal contact with plate 3. In the illustrated embodiment, the heating element has the form of a longitudinal strip 51 with heating coils or wire 52 formed therein. For example, strip 51 may be adhered directly to plate 3 with an adhesive. The heating strip, as well as any adhesive thereon, should be formed of a material that will not melt or otherwise deteriorate due to heat generated in the heating coils or wire, and preferably has sufficient flexibility to conform to the bottom surface of plate 3. Various printed, etched strips of heating coils are available for this purpose, such as those supplied by Thermal Circuits, Boston, Massachusetts, USA. Such a construction provides for relatively simple and cost effective assembly, although other arrangements are within the scope of this invention. For example, the heating element may be molded into the base of the device, with the plate 3 in contact with the heating element.

Accordingly, support member 2 is in thermal contact with a heat source, which in the described embodiment, comprises heating element 5. Intermediate the support member and heat source is a heat distributor, having the form of plate 3 in the illustrated embodiment. Heat is transferred from the heat source, through the heat distributor and support member, into an operator's wrist and/or hand supported on the support member.

Figure 5:
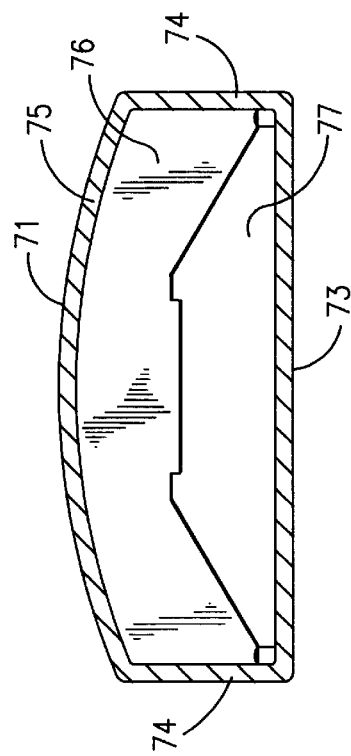
FIG. 5 is a cross-sectional view of an end base member of FIG. 1.

The plate 3 and heating element 5 are mounted in a base. In the described embodiment, the base includes bottom base member 60, and end base members 71, 72. The base members are also illustrated in FIG. 4, a cross-section view along line 4—4, and in FIG. 5, a cross-section view of end base member 71.

Bottom base member 60 has the general form of an elongate hollow shell with a top opening 61 extending along the longitudinal axis of member 60. Bottom base member includes a bottom, planar surface 65, and two inwardly inclined surfaces 66 diverging towards one another from opposed edges of bottom surface 65, the upper edges of surfaces 66 being separated from each other by opening 61. Adjacent the longitudinal top opening 61 are two opposed channels 62. Channels 62 may have a substantially U-shaped cross-sectional shape and be formed between an upper finger 63 and a lower finger 64 extending along upper edges of inclined surfaces 66. The opposed lengthwise edges of planar surface 31 of plate 3 are received in channels 62, such that the lower edge of surface 31 rests on lower fingers 64, thereby supporting plate 3. Accordingly, as seen in FIG. 1, when support member 2 is received on plate 3, no portion of plate 3 is exposed. Plate 3 may include a downwardly depending flange 33 at an end thereof for engaging with an end surface of the bottom base member, to assist in aligning plate 3 with this base member.

Bottom base member 60 is preferably constructed of a relative rigid material so that it adequately supports plate 3 and support member 2 received on plate 3, and so that is does not bend under the weight of an operator's wrist placed on the device. Additionally, it is preferred that bottom base member 60 is constructed of a material with relatively low heat conductivity, for example, a lower heat conductivity than plate 3 or support member 2, so that minimal heat generated by heating element is transferred to the base member. A suitable material is a plastic resin such as acrylonitrile-butadiene-styrene (ABS).

The end base members 71, 72 may have the form of a shell comprising a planar bottom section 73. The outer surface of bottom section 73 may rest on a work surface adjacent a computer keyboard, and bottom surface 65 of bottom base member 60 rests on the inner surface of bottom section 73. If desired, the outer surface of section 73 may have a layer or sections of skid-resistant material thereon. In addition, the end support members may include two side sections 74 extending upwardly from opposed edges of the bottom section 73, and a curved upper section 75 connecting upper edges of these side sections. The near ends of end base members 71, 72 may include vertical surfaces 76 with apertures 77 therein. When support member 2 is received on plate 3, support member 2 preferably extends fully between surfaces 76 of the two end base members. Apertures 77 are preferably shaped to receive bottom surface 65 and inwardly inclined surfaces 66 therethrough. Side panels 78, 79 may be inserted into far ends of end base members 71, 72, respectively. The end base members, and side panels therefor, may be constructed of a similar material as bottom base member 60.

As mentioned, the embodiment illustrated in FIGS. 1 and 2 is especially adapted for use in conjunction with a computer keyboard. Accordingly, for this embodiment, support member 2 preferably has a length of about 10 to about 20 inches (about 025 to about 0.51 m), especially about 14 to about 18 inches (about 0.36 to about 0.46 m). Also, according to the described embodiment, support member 2 has a width of about 1 to about 3 inches (about 0.025 to about 0.076 m), especially about 1.5 inches (about 0.38 m).

FIGS. 1 and 2 also illustrate that the device may include an electrical cord 80 for connecting the device to a power source. Cord 80 may extend through side panel 78, and is in electrical connection with the heating element 5. For the illustrated embodiment, cord 80 and heating element 5 are connected via control 82 which may be housed in the end base member. For example, control 82 includes a thermostat to regulate the temperature generated in the heating element. Knob 81 may also be provided on the exterior of the device, and connected to control 82, to provide manual adjustment of the thermostat by a user. The electrical connections for this embodiment are shown schematically in FIG. 7. It is understood that other configurations are possible, the main consideration being that a power source is provided for the heat unit. For example, the device may include a battery power source, such as a rechargeable battery housed in an end base member, in electrical connection with heating element 5.

Figure 7:
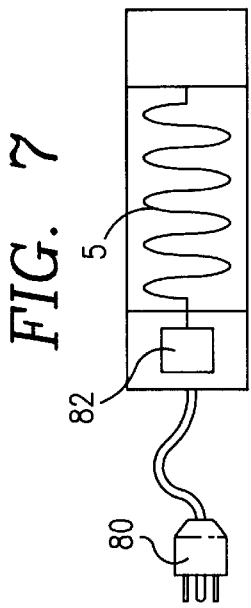
FIG. 7 is a schematic view of an electrical and heating system.

FIG. 3 illustrates an alternate embodiment of the invention, where device 1 is especially adapted for use in conjunction with a computer mouse. Accordingly, this device may be placed on a work surface adjacent a mouse pad, pad so that an operator may rest the wrist on the support member while operating the mouse. This embodiment may have the same general configuration and components as discussed above in relation to FIGS. 1, 2, 4, 5 and 7, but since the support member needs to accommodate only one wrist of an operator, the support member 2 has a shortened length, for example, about 3 to about 7 inches (about 0.076 m to about 0.18 m), especially about 4 to about 6 inches (about 0.10 to about 0.15 m). Plate 3, heating element 5, and the base member are sized accordingly to accommodate a support member of this size. This embodiment of FIG. 3 may include electrical connections as illustrated in FIG. 7. This embodiment may also be placed adjacent to, and used in conjunction with, a desk top calculator such as used in the accounting field.

As for the previously described embodiments, support member 2, once heated, may be removed from plate 3 by an operator and placed on a part of the body to obtain heat therapy. For the embodiment illustrated in FIG. 3, the support member is sized appropriately for placement on the operator's forehead.

Figure 8:
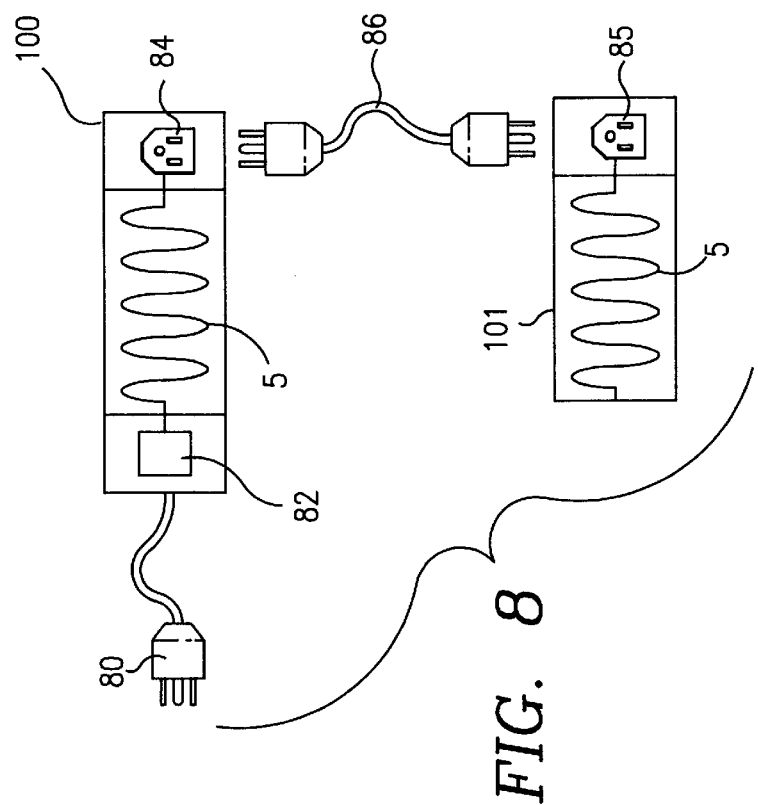
FIG. 8 is a schematic view of an alternate electrical and heating system.

According to another embodiment, two devices of this invention may be in electrical connection with each other and electrically connected to a single power source. Such an arrangement is schematically illustrated in FIG. 8, where device 100 is especially adapted for a computer keyboard and device 101 is especially adapted for a computer mouse. Device 100 may have a configuration as in FIG. 1, where receptacle 84 is provided in end base member 72. Device 101 may have the configuration as illustrated in FIG. 6 and including receptacle 85. Receptacles 84 and 85 may be electrically connected by adapter 86, or alternately, permanent wiring may link devices 100 and 101. As illustrated in FIG. 8, the heating elements 5 of both devices may be regulated by a single control 82; alternately, a separate control may be provided for each device.

Alternate constructions of the base are within the scope of this invention. For example, the base may not include the separate bottom and end support members, and the various base members need not have the form of a shell but may be constructed of a solid plastic material. However, the construction in the described embodiments provides for easy and relatively inexpensive assembly, and provides a convenient manner of accommodating various electrical and control components of the device.

Figure 9:
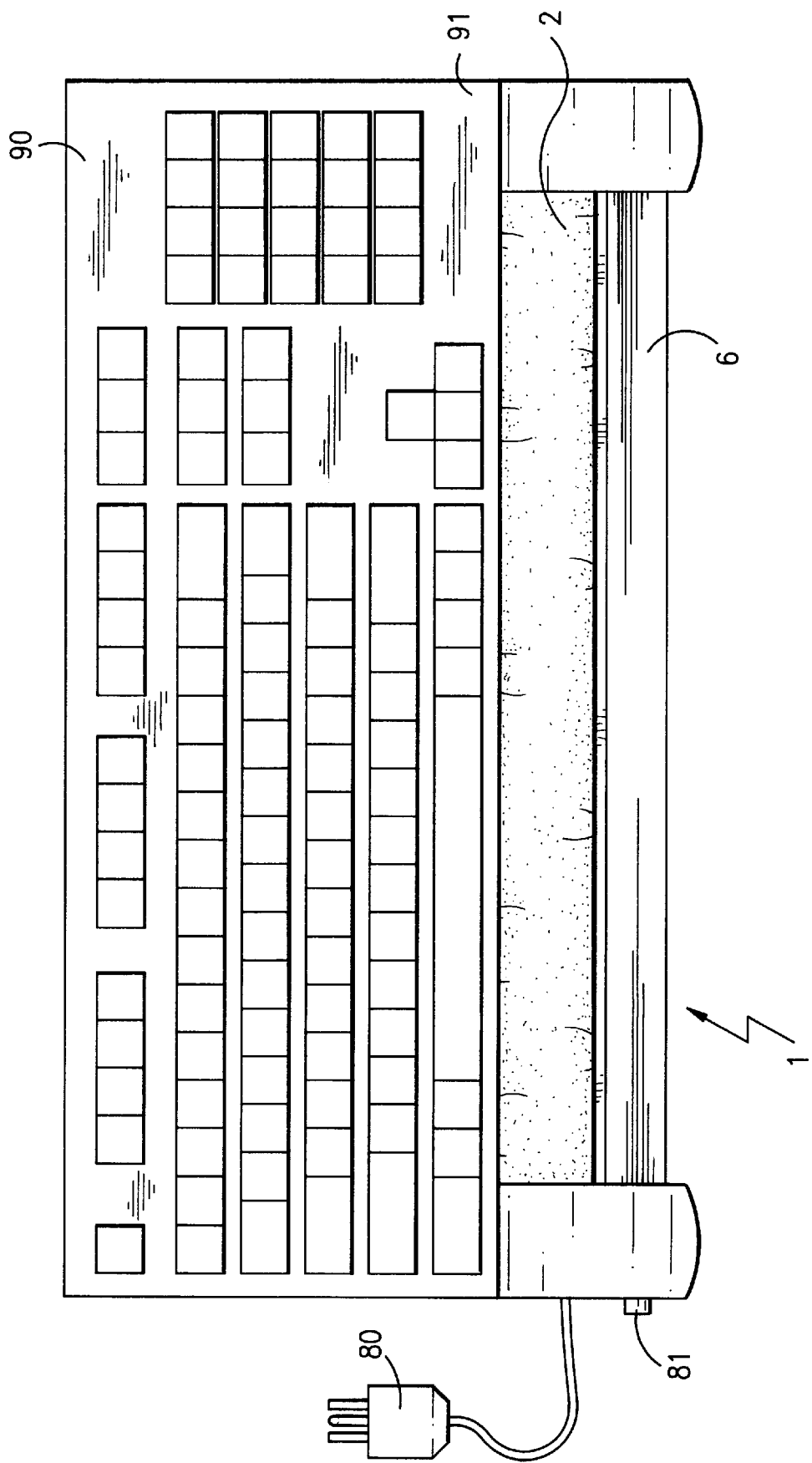
FIG. 9 is a plan view of an alternate configuration of the wrist support device.

One alternate configuration of a base is illustrated in FIG. 9. According to this embodiment, the base 6 of the support device 1 is integrally molded with the frame 91 of a computer keyboard 90.

Each of the described embodiments provides an improved device for supporting at least a portion of the wrist or hand during operation of a computer keyboard, mouse or the like. The flexible, deformable body support member is comfortable to the wrist or hand, and at least partially conforms to the operator's wrist or hand when supported thereon. The device provides heat to a wrist or hand supported thereon so to relieve fatigue and/or reduce stress induced by repetitive motion. It is preferred that the support member is heatable to a temperature above ambient room temperature (72° F., 22° C.), and preferably it is heatable to a temperature above normal body temperature (98.6° F., 37° C.). It may be desired that the heat distribution plate may be initially heated to a relatively high temperature (for example, 140° F., 60° C.) to provide quicker initial heating of the support member, where the operator may adjust the temperature downward after the support member is heated initially.

While the invention has been described with reference to preferred embodiments, it will be understood by those skilled in the art that various changes may be made and equivalents may be substituted for elements thereof without departing from the scope of the invention. In addition, many modifications may be made to adapt a particular situation of material to the teachings of the invention without departing from the scope of the invention. Therefore, it is intended that the invention not be limited to the particular embodiments disclosed as the best mode contemplated for carrying out this invention, but that the invention will include all embodiments falling within the scope and spirit of the appended claims.

What is claimed:

1. A device for supporting at least a portion of a wrist or hand, comprising:

a support member comprising a flexible, deformable body;

an inflexible thermally conductive plate having a concave depression supporting the support member;

a heat source in thermal connection with the plate so that heat from the heat source is transferred through the support member body to a wrist or hand supported on the support member body; and an at least substantially rigid hollow base member having the form of a shell with an opening at its top supporting the plate member.

2. The device of claim 1, wherein the support member body comprises a flexible casing with a heat conductive fluid therein.

3. The device of claim 2, wherein the fluid is a liquid-containing medium having a viscosity higher than 1 poise at 20° C.

4. The device of claim 3, wherein the fluid is a liquid-containing medium having a viscosity of at least 15 poise at 20° C.

5. The device of claim 1, wherein the support member has sufficient deformability to at least partially conform to the weight of a wrist or hand supported thereon.

6. The device of claim 5, wherein the support member does not fully collapse under the weight of a wrist or hand supported thereon.

7. The device of claim 1, wherein the plate is metal.

8. The device of claim 7, wherein the support member body comprises a flexible casing with a heat conductive fluid therein for placement on an upper surface of the metal plate.

9. The device of claim 1, wherein the support member body has a length of about 10 to about 20 inches.

10. The device of claim 1, wherein the support member body has a length of about 3 to about 7 inches.

11. The device of claim 1, wherein the base comprises a bottom surface for resting on a work surface adjacent a computer keyboard or mouse.

12. The device of claim 1, wherein the base comprises a bottom base member and two end base members at each end of the bottom base member, wherein the support member extends between the two end base members.

13. The device of claim 1, wherein the base is integrally formed with a frame of a computer keyboard.

14. The device of claim 1, wherein the support member is not permanently attached to the plate, whereby a user of the device may remove the support member in a heated condition for placement on the user's body.

15. The device of claim 1, wherein the heat source comprises an electrical heating element.

16. The device of claim 15, wherein the heat source is molded into the base.

17. A combination comprising:
   a computer keyboard or mouse; and
   a device for placement adjacent the keyboard or mouse and for supporting at least a portion of a wrist or hand operating the keyboard or mouse, said device comprising a support member comprising a flexible, deformable body, an inflexible thermally conductive plate having a concave depression in contact therewith, a heat source in thermal connection with a lower surface of the plate, so that heat from the heat source is transferred through the support member body to a wrist or hand supported on the support member body, and an at least substantially rigid hollow base member having the form of a shell with an opening at its top.

18. A combination comprising first and second devices, each of said first and second devices comprising a support member including a flexible, deformable, heat conductive body having an upper surface, an inflexible thermally conductive plate having a concave depression in contact therewith, a heat source in thermal connection with a lower surface of the plate, and an at least substantially rigid hollow base member having the form of a shell with an opening at its top beneath the plate, wherein the support member body of the first device has a length sufficient to accommodate placement of two wrists of a person on the upper surface thereof, and the support member body of the second device has a length sufficient to accommodate placement of only one wrist of a person on the upper surface thereof.

19. The combination of claim 18, wherein the heat source of the first device is in electrical connection with a power source, and the heat source of the second device is connected in series to the power source through the first device.

20. A method for inputting data to a computer which simultaneously treats repetitive motion stress to at least a portion of a computer user's hand, said method comprising manually operating a computer input device that is operated by a repetitive motion by a user, and heating at least a portion of a user's hand or wrist during said operating while the user's hand or wrist is supported on a heated, flexible, deformable body that has at least partially conformed to the user's hand or wrist supported thereon, said body being in thermal contact with an inflexible thermally conductive plate having a concave depression and being supported by an at least substantially rigid hollow base member having the form of a shell with an opening at its top beneath the plate.

21. A heated wrist support, comprising:
   an at least substantially rigid elongated base with low thermal conductivity having two elongated side edges and two end edges;
   first and second arms attached to the base at the side edges, and extending towards each other and terminating at opposed second edges;
   first and second elongated slots in the opposed second edges of the arms;
   an elongated thermally conductive plate having a concave U-shaped recess and first and second laterally extending tabs engaging the first and second elongated slots;
   a heating element in contact with a bottom surface of the plate;
   an elongated fluid-filled tube engaging the plate, and positioned within the U-shaped recess.

22. The wrist support of claim 21, further comprising first and second end base members, one located along each end edge.

23. The wrist support of claim 22, further comprising layers of skid-resistant material along the bottom of each base end piece.

* * * * *